United States Patent [19]

Dirksing

[11] Patent Number: 5,224,763
[45] Date of Patent: Jul. 6, 1993

[54] METHOD OF FASTENING BRISTLE TUFTS TO BRISTLE CARRIER

[75] Inventor: Robert S. Dirksing, Cincinnati, Ohio

[73] Assignee: The Procter & Gamble Company, Cincinnati, Ohio

[21] Appl. No.: 814,847

[22] Filed: Dec. 30, 1991

[51] Int. Cl.⁵ .............................................. A46D 3/06
[52] U.S. Cl. ...................................... 300/21; 264/243
[58] Field of Search ........................... 300/21; 264/243

[56] References Cited

U.S. PATENT DOCUMENTS

| | | |
|---|---|---|
| Re. 22,938 | 11/1947 | Kisky . |
| Re. 27,455 | 8/1972 | Lewis, Jr. . |
| 74,560 | 2/1868 | Maury . |
| 105,373 | 7/1870 | Ruset . |
| 764,898 | 7/1904 | Mumford . |
| 803,995 | 11/1905 | Davenport . |
| 958,371 | 5/1910 | Danek . |
| 1,018,927 | 2/1912 | Sarrazin . |
| 1,382,681 | 6/1921 | Segal . |
| 1,723,349 | 8/1929 | Hastings . |
| 2,035,709 | 3/1936 | Laub et al. . |
| 2,066,068 | 12/1936 | Cooke . |
| 2,114,947 | 4/1938 | Warsaw . |
| 2,224,788 | 12/1940 | Jobst . |
| 2,227,126 | 12/1940 | Cooke . |
| 2,303,800 | 12/1942 | Swann . |
| 2,348,515 | 5/1944 | Baumgartner . |
| 2,426,328 | 8/1947 | Wandel et al. . |
| 2,488,873 | 11/1949 | Maynard . |
| 2,567,080 | 9/1951 | Pifer . |
| 2,587,792 | 3/1952 | Von Sivers . |
| 2,631,320 | 3/1953 | Bressler . |
| 2,643,158 | 6/1953 | Baldanza . |
| 2,653,056 | 9/1953 | Montero et al. . |
| 2,664,316 | 12/1953 | Winslow, Jr. et al. . |
| 2,677,842 | 5/1954 | Sherwin . |
| 2,710,774 | 6/1955 | Baumgartner . |
| 2,736,917 | 3/1966 | Goldstein et al. . |
| 2,783,490 | 3/1967 | Kutik . |
| 2,797,424 | 7/1967 | Olson . |
| 3,408,112 | 10/1968 | Piotrowski . |
| 3,471,202 | 10/1969 | Lewis, Jr. . |
| 3,545,025 | 12/1970 | O'Connell . |
| 3,563,609 | 2/1971 | Lewis, Jr. . |
| 3,580,761 | 5/1971 | Boultinghouse . |
| 3,596,999 | 8/1971 | Lewis, Jr. . |

(Continued on next page.)

FOREIGN PATENT DOCUMENTS

| | | |
|---|---|---|
| 0060592 | 9/1982 | Belgium . |
| 0078569 | 11/1983 | Belgium . |
| 566092 | 12/1932 | Fed. Rep. of Germany ........ 300/21 |

(Continued on next page.)

OTHER PUBLICATIONS

C. Kockapan and W. E. Wetzel, Quality Testing the Ends of Bristles of Toothbrushes for Children, Zahnaerztilche Mitteilungen, 1987, vol. 16, pp. 1740–1745.

Leon M. Silverstone, A scanning electron microscope study of the end rounding of bristles in eight toothbrush types, Quintessence International, 1988, vol. 2 pp. 87–107.

Primary Examiner—Mark Rosenbaum
Assistant Examiner—Frances Chin
Attorney, Agent, or Firm—E. Kelly Linman

[57] ABSTRACT

An improved method for fastening thermoplastic bristle tufts to a thermoplastic bristle carrier. The bristle carrier includes premolded holes with outwardly extending generally concentric collars to receive the bristle tufts. The bristles in each of the tufts to be secured to the carrier have their fastening ends melted and fused together to form a thickened fastening end portion. The thickened fastening end portion of each tuft has a cross-section which is no greater than the corresponding cross-section of the premolded hole and outwardly extending collar on the carrier. The premolded collars and the adjacent side wall portions of the premolded holes in the carrier are softened by non-contact heating means, the thickened fastening end portions of the bristle tufts are inserted into the premolded holes and their associated collars substantially without interference therebetween, and the softened collars are swaged about the thickened fastening end portions of the bristle tufts, thereby securing the bristle tufts to the carrier when the swaged collars cool and harden. Because the collars comprise only a small amount of thermoplastic material, heating and cooling requirements to effect joinder are minimized, thereby reducing the overall cycle time for the present process. In addition, the small amount of localized heating in the collars avoids unsightly damage to or distortion of the carrier.

15 Claims, 2 Drawing Sheets

U.S. PATENT DOCUMENTS

| | | | |
|---|---|---|---|
| 3,604,043 | 9/1971 | Lewis, Jr. | |
| 3,633,974 | 1/1972 | Lewis, Jr. | |
| 3,641,610 | 2/1972 | Lewis, Jr. | |
| 3,774,782 | 11/1973 | Lewis, Jr. | |
| 3,795,024 | 3/1974 | Weihrauch | |
| 3,798,699 | 3/1974 | Lewis, Jr. | |
| 3,799,616 | 3/1974 | Lewis, Jr. | |
| 3,803,663 | 4/1974 | Weihrauch | |
| 3,857,134 | 12/1974 | Wells | |
| 3,879,791 | 4/1975 | Isler | |
| 3,910,637 | 10/1975 | Lewis, Jr. | |
| 4,009,910 | 3/1977 | Lewis, Jr. | |
| 4,109,965 | 8/1978 | Lewis, Jr. | |
| 4,132,449 | 1/1979 | Bergman | |
| 4,189,189 | 2/1980 | Lewis, Jr. | |
| 4,255,224 | 3/1981 | Lorenz | |
| 4,263,691 | 4/1981 | Pakarnseree | |
| 4,291,431 | 9/1981 | Lewis, Jr. | |
| 4,310,377 | 1/1982 | Lorenz | |
| 4,348,060 | 9/1982 | Lewis, Jr. | |
| 4,355,847 | 10/1982 | Schnekenburger et al. | |
| 4,356,585 | 11/1982 | Protell et al. | |
| 4,390,384 | 6/1983 | Turner | |
| 4,472,853 | 9/1984 | Rauch | |
| 4,589,791 | 5/1986 | Weihrauch | |
| 4,592,594 | 5/1986 | d'Argembeau | |
| 4,609,228 | 9/1986 | Bickel | |
| 4,619,485 | 10/1986 | Lewis, Jr. | |
| 4,635,313 | 1/1987 | Fassler et al. | |
| 4,637,660 | 1/1987 | Weihrauch | |
| 4,646,381 | 3/1987 | Weihrauch | |
| 4,679,273 | 7/1987 | Okin | |
| 4,690,277 | 9/1987 | Lewis, Jr. | |
| 4,693,519 | 9/1987 | Lewis, Jr. | |
| 4,696,519 | 9/1987 | Lewis, Jr. | |
| 4,749,233 | 6/1988 | Weihrauch | |
| 4,762,373 | 8/1988 | Amos et al. | |
| 4,766,633 | 8/1988 | Clark | |
| 4,776,054 | 10/1988 | Rauch | |
| 4,776,055 | 10/1988 | Nelson | |
| 4,804,232 | 2/1989 | Weihrauch | |
| 4,807,938 | 2/1989 | Weihrauch | |
| 4,892,698 | 1/1990 | Weihrauch | |
| 4,893,876 | 1/1990 | Weihrauch | |
| 4,936,633 | 6/1990 | Weihrauch | |
| 4,938,539 | 7/1990 | Barman | 300/21 |
| 4,954,305 | 9/1990 | Weihrauch | |
| 4,979,782 | 12/1990 | Weihrauch | |
| 4,988,146 | 1/1991 | Weihrauch | |
| 5,011,230 | 4/1991 | Weihrauch | |
| 5,033,797 | 7/1991 | Rueb | 300/21 X |
| 5,045,267 | 9/1991 | Weihrauch | |

FOREIGN PATENT DOCUMENTS

| | | | |
|---|---|---|---|
| 830339 | 2/1952 | Fed. Rep. of Germany | |
| 845933 | 6/1953 | Fed. Rep. of Germany | |
| 1049823 | 2/1959 | Fed. Rep. of Germany | |
| 1532809 | 4/1970 | Fed. Rep. of Germany | |
| 2335468 | 2/1975 | Fed. Rep. of Germany | |
| 1604673 | 9/1975 | Fed. Rep. of Germany | |
| 2402785 | 3/1979 | Fed. Rep. of Germany | |
| 2840833 | 4/1980 | Fed. Rep. of Germany | |
| 2903399 | 7/1980 | Fed. Rep. of Germany | 300/21 |
| 2922877 | 12/1980 | Fed. Rep. of Germany | |
| 0086412 | 8/1983 | Fed. Rep. of Germany | |
| 142885 | 5/1985 | Fed. Rep. of Germany | |
| 8427132.9 | 5/1985 | Fed. Rep. of Germany | |
| 149996A | 7/1985 | Fed. Rep. of Germany | |
| 3403341A1 | 8/1985 | Fed. Rep. of Germany | |
| 3433763C1 | 2/1986 | Fed. Rep. of Germany | |
| 3505972 | 8/1986 | Fed. Rep. of Germany | |
| 3533533 | 9/1986 | Fed. Rep. of Germany | |
| WO89/05706 | 6/1989 | Fed. Rep. of Germany | |
| 0150785 | 12/1989 | Fed. Rep. of Germany | |
| 24783 | 8/1951 | Finland | |
| 695325 | 12/1930 | France | |
| 721045 | 2/1932 | France | 300/21 |
| 794580 | 2/1936 | France | |
| 1057279 | 3/1954 | France | |
| 1467935 | 2/1967 | France | |
| 481883 | 6/1953 | Italy | 300/21 |
| 589650 | 3/1959 | Italy | 300/21 |
| 53-29846 | 3/1978 | Japan | |
| 0247224 | 12/1987 | Japan | |
| 278315 | 4/1928 | United Kingdom | 300/21 |

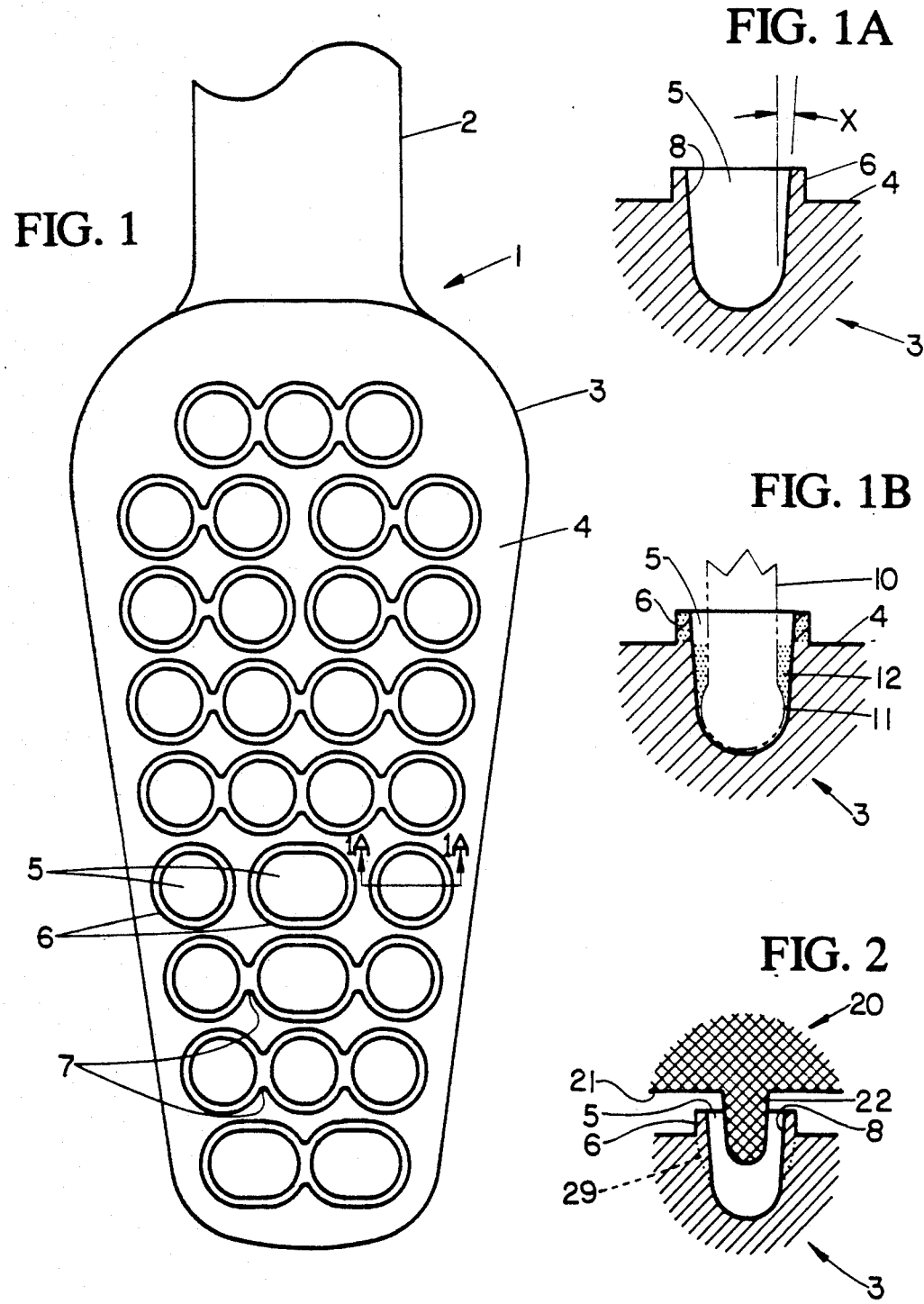

METHOD OF FASTENING BRISTLE TUFTS TO BRISTLE CARRIER

TECHNICAL FIELD

The present invention pertains to an improved method of making thermoplastic brushes in which fused and thickened ends of bristle tufts are inserted into premolded holes with outwardly extending generally concentric collars on a brush member. The concentric collar material is heated and softened prior to inserting the bristle tufts. After insertion of the bristle tufts the softened collar material is displaced to fill the void about the thickened fastening ends of the bristle tufts. Upon cooling of the swaged collar material, the bristle tufts are locked in place.

BACKGROUND OF THE INVENTION

Many processes for fastening thermoplastic bristle tufts to thermoplastic bristle carriers are disclosed in the prior art.

U.S. Pat. No. 3,604,043 issued to Lewis on Sept. 14, 1971 discloses a tuft attachment means wherein the end portions of a group of parallel fibers are heated in a shaping mold. The fibers remain in the heater long enough to fuse, but not melt, their ends and create a self-supporting heat-sealed tuft. The fused mass is shaped to a tapering configuration so that its cross-section, as measured perpendicular to the longitudinal axis of the tuft, is less than the cross-section of the fiber bundle. The softened fused portion of the tuft is immediately inserted into a tuft hole in the brush head forcing the softened fused portion of the tuft to conform to the geometric confines of the tuft hole.

U.S. Pat. No. 4,609,228 issued to Bickel on Sept. 2, 1986 discloses several different methods for attaching bristle tufts to a brush member. One such disclosed method is to heat both the pre-fused fastening ends of the bristle tufts and the corresponding fastening locations on the brush member to the point of softening and then cause the bristle tufts to be impressed against the brush member, thereby welding the bristle tufts to the brush member. Another disclosed method is to form a mushroom in a fused end of a bristle tuft by means of a heated mold and then injection molding the brush material about the mushroom to fasten the bristle tuft to the brush member. Still another disclosed method is to form an undercut hole in the brush member and introduce the heated and softened end of a bristle bundle at high speed into the hole so that the softened end compresses and fills the hole. Still another disclosed method is to attach the bristle bundle by narrowing the outermost part of hole in the brush member by means of frictional heat, such as ultrasound or spinning the sleeves that supply and hold the bristle tufts after insertion of the bristle bundles into the holes.

U.S. Pat. No. 4,637,660 issued to Weihrauch on Jan. 20, 1987, which is hereby incorporated herein by reference, discloses a method for connecting bristles to a bristle carrier which also begins by melting the ends of bundles of bristles, thereby causing the end of each bundle to convert to a non-oriented balled form comprising a thickened portion at the fastening end of each tuft. In one embodiment, the thickened ends of the bristle bundles are pressed into the heated and melted receiving side of the bristle carrier. The melted material of the bristle carrier flows behind the thickened ends so that the craters formed by insertion of the bristle bundles are then closed by the intrusion of melted material. In another disclosed embodiment, recesses that correspond to the bristle bundle set are either preformed or formed in the bristle carrier by means of hot pins extending from a heating element. Upon melting of the receiving side of the bristle carrier, the molten material flows outwardly in annular collars extending from the receiving surface of the bristle carrier. The thickened ends of the bristle bundles are pressed into the recesses in the carrier and the molten material of the annular collars again flows behind the thickened portions of the bundles.

U.S. Pat. No. 4,988,146 issued to Weihrauch on Jan. 29, 1991, which is also hereby incorporated herein by reference, discloses a method for connecting bristles to a bristle carrier which begins by melting the fastening ends of the bristle bundles accompanied by a shortening of the length of the bundle and formation of a thickened portion. Holes in the bristle carrier are formed with an at least zonally smaller cross-section than that of the thickened portions on the bristle bundles. The thickened portions of the bundles and/or the walls of the holes in the carrier are heated to their softening temperature(s). Upon insertion of the bristle bundles, the interference of the thickened portion of the bristle bundles causes displacement of the side wall material in the carrier, forming a bulge about the opening of the hole. The bulged material of the bristle carrier is thereafter shaped by a mold to produce a smooth exposed surface on the bristle carrier.

Drawbacks associated with the aforementioned prior art joinder processes include: excessively complex machinery, excessive heating and distortion of the bristle carrier, long manufacturing cycle times due to heating and cooling large amounts of thermoplastic material, the need for excessive bristle tuft clamping forces which can cause damage to the individual bristles contained within the bristle tufts, and satisfaction of critical operating parameters such as, time, temperature, and positioning tolerance, etc.

In light of the foregoing difficulties, it is an object of the present invention is to provide a simplified method of attaching thermoplastic bristle tufts to a thermoplastic bristle carrier while employing minimal heat input and minimal material distortion.

DISCLOSURE OF THE INVENTION

In accomplishing the foregoing objective, the present invention employs a thermoplastic bristle carrier having premolded holes with outwardly projecting, generally concentric collars. The concentric collars are softened by non-contact heating. Thermoplastic bristle tufts having their fastening ends melted and fused together to form a thickened fastening end portion that is no greater in cross-section, as measured perpendicular to the longitudinal axis of the bundle, than the cross-section of the premolded holes in the carrier. Mechanical swaging means are applied to the softened concentric collars after the thickened fastening end portions of the bristle tufts have been fully inserted into the premolded holes in the bristle carrier, thereby swaging the bulk of the softened collar material into the void within each premolded hole above the thickened fastening end portion of each of the bristle tufts. Upon cooling of the softened carrier material, the bristle tufts become locked into the bristle carrier.

The volume of material comprising each collar is preferably approximately equivalent to or slightly greater than the void volume which remains within each premolded hole in the bristle carrier after the hole in the carrier has been partially filled by the thickened fastening end portion of the bristle tuft and that portion of the non-fused bristle material which is located below the general surface of the bristle carrier. As a result the surface of the bristle carrier is substantially smooth or slightly domed after the swaging operation has been completed.

Because only a small amount of the carrier material need be heated to carry out the joinder process of the present invention, the required cycle time is significantly reduced. Also, because the thickened fastening end portion's cross-section is no greater than that of the premolded hole in the carrier it is not required to undergo any appreciable deformation during the insertion process. This minimizes the required amount of clamping force on the bristle tufts and consequently minimizes damage to the bristles. Furthermore, the relatively small amount of localized heating required in the present joinder process minimizes distortion and damage to the carrier.

BRIEF DESCRIPTION OF THE DRAWINGS

While the specification concludes with claims that particularly point out and distinctly claim the subject matter regarded as forming the present invention, it is believed that the invention will be better understood from the following description and drawings in which:

FIG. 1 is an enlarged partial plan view of a bristle carrier including premoded holes with generally concentric collars of the type used in practicing a particularly preferred embodiment of the present invention.

FIG. 1A is a greatly enlarged cross-sectional view of a premolded hole and its concentric collar in the bristle carrier illustrated in FIG. 1, said view being taken along section line 1A—1A of FIG. 1;

FIG. 1B is a cross-sectional view of the premolded hole and concentric collar illustrated in FIG. 1A with a phantom outline of a bristle tuft fully inserted therein;

FIG. 2 is a cross-sectional view of the premolded hole and concentric collar illustrated in FIG. 1A with a non-contact radiant heat source including a heated projection partially inserted therein;

DETAILED DESCRIPTION OF THE INVENTION

Figure 3:
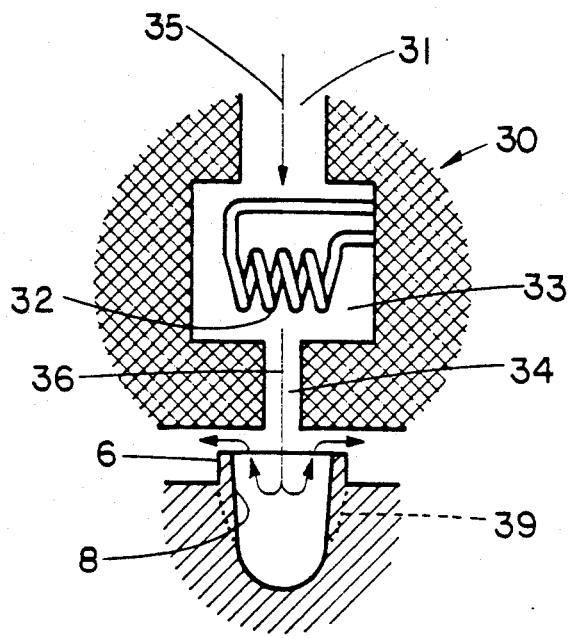
FIG. 3 is a cross-sectional view of the premolded hole and concentric collar illustrated in FIG. 1A wherein the non-contact means used to soften the collar and the adjacent side wall portions of the premolded hole comprises a pressurized heated gas.

FIG. 1 shows a greatly expanded partial plan view of a thermoplastic bristle carrier used in a particularly preferred embodiment of the present invention. Bristle carrier 1, which can be a toothbrush, comprises handle 2 (only partially shown) and brush head 3. Brush head 3 is provided with holes 5 and collars 6 on brush surface 4. Holes 5 and collars 6 are preferably preformed during a thermoplastic injection molding process. Collars 6 are generally concentric about holes 5. Although nearly any shape is possible, holes 5 and collars 6 are typically circular or oval in shape depending upon the desired cross-sectional configuration of the bristle tuft to be inserted. Close positioning of holes 5 may cause collars 6 to touch or intersect one another. In this event, webs 7 at the junctions of collars 6 may be formed, as generally shown in FIG. 1. The location and shape of holes 5 is dependent upon the design and intent of the particular brush.

FIG. 1A shows a cross-sectional view of a typical hole 5 and collar 6 on brush head 3, said view being taken along section line 1A—1A of FIG. 1. Collar 6 projects above brush surface 4 and is generally concentric about hole 5. In a particularly preferred embodiment side wall 8 of hole 5 and the interior passageway in collar 6 flare outwardly at a very slight angle designated as "X", as generally shown in FIG. 1A. This flare improves release of the bristle carrier 1 from the injection mold and facilitates easier introduction of the thickened fastening end portions of the bristle tufts without interference during the joinder process.

FIG. 1B is a similar cross-sectional view of hole 5 and collar 6 taken along section line 1A—1A in FIG. 1, but includes a phantom outline of a bristle tuft 10 having a fused thickened fastening end portion 11 at its base, said fastening end portion being fully inserted into hole 5 and collar 6. The volume of material comprising collar 6 above brush surface 4 is generally equivalent to or slightly greater than the void volume surrounding the uppermost portion of the thickened fastening end portion 11 of the bristle tuft 10 and that portion of the non-fused bristle material which are located below brush surface 4. This void volume is generally indicated at 12 in FIG. 1B.

In the embodiment of FIG. 2, warming and softening of collar 6 and the adjacent portions of side wall 8 is accomplished by means of a non-contact radiant heater 20. Non-contact radiant heater 20 comprises heater face 21 and heater pin 22 which projects only partially into hole 5 in brush head 3. Radiant heat is applied to collar 6 and the adjacent portions of side wall 8 to effect softening of the thermoplastic material generally with boundary 29, which is illustrated schematically in FIG. 2.

In the alternative embodiment of FIG. 3, warming and softening of collar 6 and the adjacent portions of side wall 8 is accomplished by means of a non-contact convection heater 30. Non-contact convection heater 30 comprises a gas inlet 31, a heater chamber 33, a heater coil 32, and a gas outlet 34. Inlet 31 is connected to a pressurized gas supply which provides gas flow as indicated by arrow 35. The gas flow passes through heater chamber 33 and is warmed by heater coil 32. Heated gas indicated by arrows 36 exits outlet 34 and enters hole 5 warming a portion of the side wall 8 and collar 6, thereby softening the thermoplastic material generally within boundary 39, which is illustrated schematically in FIG. 3.

Figure 4:
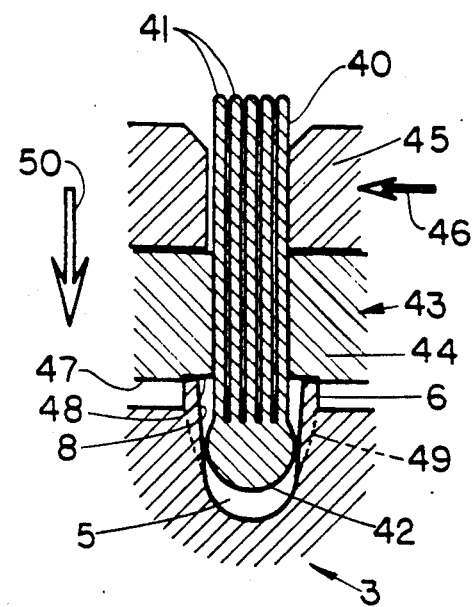
FIG. 4 is a cross-sectional view of the premolded hole and concentric collar illustrated in FIG. 1A as a bristle tuft clamp including a swaging tool is being used to insert the thickened fastening end portion of a bristle tuft into a premolded hole in the carrier after heating of the outwardly extending collar and the adjacent side wall portions of the premolded hole in the carrier has been completed.

In the embodiment of FIG. 4, bristle tuft 40 comprises a multiplicity of individual bristles 41. Prior to insertion, the fastening ends of bristles 41 are preferably warmed by non-contact heating so that the ends melt and fuse to one another to form a thickened fastening end portion 42 on each bristle tuft 40. In a particularly preferred embodiment of the present invention, fused thickened fastening end portion 42 is substantially cooled and solidified prior to insertion into preformed hole 5 in brush head 3. Having the thickened fastening end portion 42 substantially cooled prior to insertion into the preformed hole 5 reduces the heat introduced into brush head 3, consequently reducing cooling and manufacturing cycle time.

Figure 5:
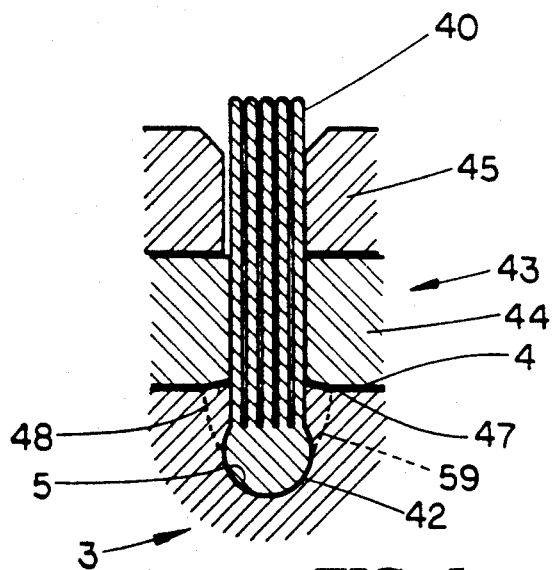
FIG. 5 is a cross-sectional view similar to that of FIG. 4, but showing the condition which exists once the thickened fastening end portion of the bristle tuft has been fully seated in the premolded hole in the carrier and the outwardly extending collar has been fully swaged over the thickened fastening end portion of the bristle tuft.

The bristle tuft clamp 43 shown in FIGS. 4 and 5 preferably comprises a fixed plate 44 and a movable plate 45. Slightly laterally shifting movable plate 45 relative to fixed plate 44, as indicated by arrow 46, securely clamps bristle tuft 40 and prevents it from slipping during the insertion process.

Moving bristle tuft clamp 43 in the direction of arrow 50 in FIG. 4 inserts the thickened fastening end portion 42 of bristle tuft 40 into hole 5. The maximum cross-section of the thickened fastening end portion 42, as measured perpendicular to the longitudinal axis of bristle tuft 40, is preferably no greater than the corresponding cross-section of hole 5, as measured with the thickened fastening end portion 42 fully inserted, so that the thickened fastening end portion 42 does not interfere with either the passageway in collar 6 or the side wall 8 of the premolded hole 5 at any time during insertion of bristle tuft 40 into the brush head 3.

Further movement of bristle clamp 43 beyond the position of FIG. 4 in the direction of arrow 50 results in the condition illustrated in FIG. 5. In particular, a swaging tool which is integral with tuft clamp 43 and which comprises swage surface 48 on face 47 of fixed plate 44 contacts the upper surface of collar 6. The warmed and softened thermoplastic material of collar 6 and those adjacent portions of side wall 8 which are generally within the schematically indicated boundary 49, as shown in FIG. 4, yield as swage surface 48 moves beyond initial contact of the uppermost surface of collar 6 in the direction of arrow 50. The slightly concave conical form of swage surface 48 aids in directing the softened thermoplastic material of collar 6 and side wall 8 inwardly toward bristle tuft 40.

In FIG. 5, bristle tuft clamp 43 is shown moved fully against brush head 3 so that face 47 of fixed plate 44 generally contacts brush surface 4. Thickened fastening end portion 42 of bristle tuft 40 has been moved to or nearly to the bottom of hole 5. The softened thermoplastic material of collar 6 and those portions of side wall 8 which were generally within zone 49 of FIG. 4 have been reformed into a reshaped mass generally within the schematically indicated boundary 59 shown in FIG. 5.

Since only the mass of material necessary to confine the thickened fastening end portion 42 of bristle tuft 40 has been softened, the heat which must dissipate from the softened thermoplastic material within boundary 59 into fixed plate 44 and/or the surrounding environment is minimal. Thus bristle tuft clamp 43 may be released and withdrawn almost immediately after the bristle tuft insertion process has been completed, thereby significantly reducing manufacturing cycle time.

Furthermore, the relatively small amount of heat introduced into brush head 3 during the joinder process of the present invention minimizes distortion of the brush head due to shrinkage of the thermoplastic upon cooling, thereby favorably impacting the quality of the resulting brush.

Still another advantage of the present invention is that there is no need to clamp the bristle tufts 40 so tightly during the insertion process as to cause damage, i.e., the bristle tuft clamp 43 is only required to maintain the position of the bristle tufts 40 during the insertion process. It does not have to reform the thickened fastening end portion 42 of the bristle tuft 40, it does not have to drive the thickened fastening end portion 42 into a mass of molten plastic, nor does it have to force the thickened fastening end portion 42 into an interfering hole. Accordingly, there is very little tendency for the bristle tuft 40 to slip relative to clamp 43 during the insertion process. Consequently clamping forces required to practice the present invention need not be so great as to cause damage to the bristles contained in the bristle tufts 40.

Finally, because the clamp 43 used in practicing the present invention is not required to introduce any softening energy, such as ultrasound or friction to the brush head 3, the insertion mechanism of the present invention is kept simple. This of course reduces the cost and complexity of the production machinery required to practice the present invention.

Figure 6:
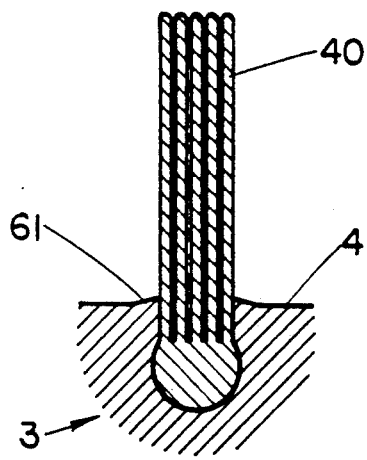
FIG. 6 is a cross-sectional view of the bristle tuft of FIG. 5 fully secured to the bristle carrier, said view illustrating the condition which exists after the clamp has been fully removed.

FIG. 6 shows bristle tuft 40 completely inserted and fastened within brush head 3. Brush surface 4 exhibits a very small generally conical mound 61 surrounding the base of bristle tuft 40. Conical mound 61 results from the impression left by the slightly concave swage surface 48 on fixed plate 44 of clamp 43. By providing slightly more thermoplastic material in collar 6 than that required to exactly fill void volume 12 shown in FIG. 1B, it is assured that the thickened fastening end portion 42 of each bristle tuft 40 will be securely locked in place in the finished brush head 3. In addition, the slightly conical mound 61 helps to prevent debris from accumulating about the base of the bristle tufts 40 when the brush is placed in service.

While particular embodiments of the present invention have been illustrated and described, it will be obvious to those skilled in the art that various changes and modifications can be made without departing from the spirit and scope of the present invention, and it is intended to cover in the appended claims all such modifications that are within the scope of this invention.

What is claimed is:

1. An improved method for fastening thermoplastic bristle tufts to a thermoplastic bristle carrier, said method comprising the steps of:
   (a) injection molding a bristle carrier to include a multiplicity of premolded holes exhibiting a first predetermined cross-section on a receiving surface of said bristle carrier, each of said premolded holes including a generally concentric collar about said premolded hoe, said collar projecting outwardly from said receiving surface;
   (b) heating fastening ends of thermoplastic bristles contained in each bristle tufts to cause said fastening ends of said bristles to fuse to one another and to form a thickened fastening end portion on each of said bristle tufts, each of said thickened fastening end portions having a lowermost portion which is to be inserted first into one of said premoded holes and an uppermost portion adjacent non-fused portions of each of said bristle tufts, each of said thickened fastening end portions further exhibiting a second cross-section, as measured perpendicular to a longitudinal axis of said bristle tufts, said second cross-section being greater than the cross-section of said non-fused portions of said bristle tufts but no greater than said first predetermined cross-section of said premoded holes in said bristle carrier;

(c) heating said generally concentric collars and adjacent side wall portions of said premolded hoes to their point of softening with non-contact heating means;

(d) inserting said thickened fastening end portions of said bristle tufts into said premolded hoes and said concentric collars without substantial interference therebetween, thereby substantially avoiding deformation of said thickened fastening end portions and creating a void between said bristle carrier and the uppermost portion of each of said thickened fastening end portions of said bristle tufts and the non-fused portions of each of said bristle tufts which is located below said receiving surface of said bristle carrier;

(e) swaging the softened thermoplastic material comprising said collars and said adjacent side wa portions of said premolded holes in said bristle carrier about said thickened fastening end portions of said bristle tufts; and (f) cooling said softened thermoplastic material in said bristle carrier to lock said thickened fastening end portions of said bristle tufts into said bristle carrier.

2. The method of claim 1, wherein the volume of thermoplastic material comprising each of said generally concentric collars to be swaged is at least equal to the volume of said void formed between each of said bristle tufts and said bristle carrier, whereby said swaging operation substantially fills each of said voids with said thermoplastic material comprising each of said collars.

3. The method of claim 1 further including the step of cooling said thickened fastening end portions of said bristle tufts to the point of solidification prior to insertion of said thickened fastening end portions of said bristle tufts into said premolded holes and said concentric collars in said bristle carrier.

4. The method of claim 1, wherein said generally concentric collars and said adjacent side wall portions of said premolded holes in said bristle carrier are softened by non-contact radiant heating.

5. The method of claim 1, wherein said generally concentric collars and said adjacent side wall portions of said premolded holes in said bristle carrier are softened by convection heating.

6. The method of claim 1, wherein said bristle carrier is injection molded to include a multiplicity of premolded holes and outwardly projecting generally concentric collars exhibiting an internal cross-section which generally increases, as measured from the bottom of said premolded holes in said bristle carrier in the direction of said collars.

7. The method of claim 1, wherein said bristle carrier is injection molded to include a multiplicity of premolded holes and outwardly projecting generally concentric collars and wherein the outermost peripheries of at least a portion of said generally concentric collars are discretely spaced from one another.

8. The method of claim 1, wherein said bristle carrier is injection molded to include a multiplicity of premolded holes and outwardly projecting generally concentric collars and wherein the outermost peripheries of at least a portion of said generally concentric collars contact one another to form a common web.

9. An improved method for fastening thermoplastic bristle tufts to a thermoplastic bristle carrier, said method comprising the steps of:

(a) injection molding a bristle carrier to include a multiplicity of premolded holes exhibiting a first predetermined cross-section on a receiving surface of said bristle carrier, each of said premoded hoes including a generally concentric collar about said premolded hole, said collar projecting outwardly from said receiving surface;

(b) heating fastening ends of thermoplastic bristles contained in each bristle tufts to cause said fastening ends of said bristles to fuse to one another and to form a thickened fastening end portion on each of said bristle tufts, each of said thickened fastening end portions having a lowermost portion which is to be inserted first into one of said premolded holes and an uppermost portion adjacent non-fused portions of each of said bristle tufts, each of said thickened fastening end portions further exhibiting a second cross-section, as measured perpendicular to a longitudinal axis of said bristle tufts, said second cross-section being greater than the cross-section of said non-fused portions of said bristle tufts but no greater than said first predetermined cross-section of said premolded holes in said bristle carrier;

(c) cooling said thickened fastening end portions of said bristle tufts to the point of solidification;

(d) heating said generally concentric collars and adjacent side wall portions of said premolded holes to their point of softening with non-contact heating means, thereby substantially avoiding deformation of said thickened fastening end portions and creating a void between said bristle carrier and the uppermost portion of each of said thickened fastening end portions of said bristle tufts and the non-fused portions of each of said bristle tufts which is located below said receiving surface of said bristle carrier;

(e) inserting said thickened fastening end portions of said bristle tufts into said premolded holes and said concentric collars without substantial interference therebetween using a bristle tuft clamp;

(f) swaging the softened thermoplastic material comprising said collars and said adjacent side wall portions of said premolded holes in said bristle carrier about said thickened fastening end portions of said bristle tufts using a swaging means which is integral with said bristle tuft clamp; and (g) cooling said softened thermoplastic material in said bristle carrier to lock said thickened fastening end portions of said bristle tufts into said bristle carrier.

10. The method of claim 9, wherein the volume of thermoplastic material comprising each of said generally concentric collars to be swaged is at least equal to the volume of said void formed between each of said bristle tufts and said bristle carrier, whereby said swaging operation substantially fills each of said voids with said thermoplastic material comprising each of said collars.

11. The method of claim 10, wherein said generally concentric collars and said adjacent side wall portions of said premolded holes in said bristle carrier are softened by non-contact radiant heating.

12. The method of claim 10, wherein said generally concentric collars and said adjacent side wall portions of said premolded holes in said bristle carrier are softened by convection heating.

13. The method of claim 9, wherein said bristle carrier is injection molded to include a multiplicity of premolded holes and outwardly projecting generally concentric collars exhibiting an internal cross-section which generally increases, as measured from the bottom of said premolded holes in said bristle carrier in the direction of said collars.

14. The method of claim 9, wherein said bristle carrier is injection molded to include a multiplicity of premolded holes and outwardly projecting generally concentric collars and wherein the outermost peripheries of at least a portion of said generally concentric collars are discretely spaced from one another.

15. The method of claim 9, wherein said bristle carrier is injection molded to include a multiplicity of premolded holes and outwardly projecting generally concentric collars and wherein the outermost peripheries of at least a portion of said generally concentric collars contact one another to form a common web.

* * * * *